United States Patent

Besnard

[11] Patent Number: 5,653,042
[45] Date of Patent: Aug. 5, 1997

[54] APPARATUS FOR DRYING CROP MATERIALS

[76] Inventor: René Besnard, Box 179, Oakbluff, Canada, R0G 1N0

[21] Appl. No.: 505,755

[22] Filed: Jul. 21, 1995

[51] Int. Cl.⁶ .................................................. F26B 11/02
[52] U.S. Cl. .................. 34/138; 34/86; 34/514
[58] Field of Search ......................... 165/905; 34/138, 34/513, 514, 86

[56] References Cited

U.S. PATENT DOCUMENTS

| 4,125,070 | 11/1978 | Besnard . | |
|---|---|---|---|
| 4,505,211 | 3/1985 | Lamare | 34/86 |
| 4,509,273 | 4/1985 | Roisen | 34/86 |
| 4,532,721 | 8/1985 | Gordon | 34/86 |
| 4,780,965 | 11/1988 | Grafen et al. | 34/514 |
| 5,136,793 | 8/1992 | Kubotani | 34/86 |
| 5,237,757 | 8/1993 | Wiedmann et al. | 34/86 |
| 5,251,385 | 10/1993 | Secor et al. | 34/86 |
| 5,271,162 | 12/1993 | Kunz et al. | 34/86 |

FOREIGN PATENT DOCUMENTS

| 0592240 | 2/1960 | Canada | 34/138 |
|---|---|---|---|
| 1001404 | 2/1973 | Canada | 34/86 |
| 0068495 | 3/1990 | Japan | 165/903 |

OTHER PUBLICATIONS

Turbomeca brochure (8 pages).
M–E–C brochure (10 pages).

Primary Examiner—Edward K. Look
Assistant Examiner—Mark Sgantzos
Attorney, Agent, or Firm—Adrian D. Battison; Murray E. Thrift

[57] ABSTRACT

The drying apparatus for crop materials particularly alfalfa includes a press with a main press roller and a plurality of subsidiary press rollers which is fed using an additional guide roller cooperating with the transportation belt and guide fingers in the main roller to direct the bulky crop into the nip between the rollers for extracting juice and providing a partially dried crop. The partially dried crop is supplied to a drying apparatus including a tumbling cylinder into which is injected heated air from a ceramic tube heat exchanger fed by a co-generation gas turbine. The gas turbine is used to generate electric power for motors in the apparatus and generates a flow of highly heated air which is passed over the ceramic tubes to heat air drawn into the tumbling cylinder for drying of the crop material.

19 Claims, 4 Drawing Sheets

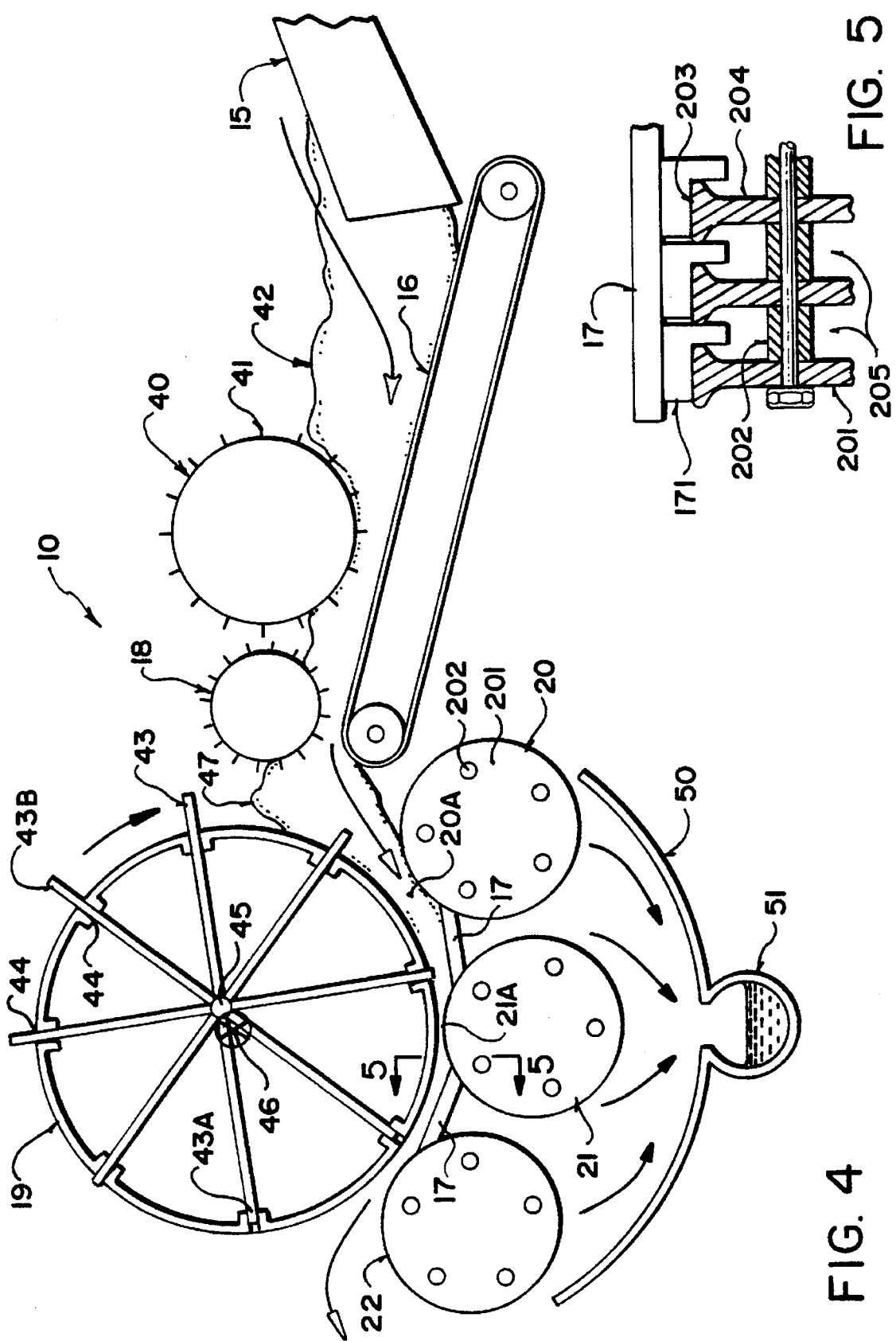

APPARATUS FOR DRYING CROP MATERIALS

This invention relates to an apparatus for drying crop material which is particularly but not exclusively designed for drying alfalfa.

BACKGROUND OF THE INVENTION

Alfalfa is a crop which has not been, up till now, utilized to its full extent and is often generally used simply as a feed material for animals. However alfalfa has significant potential in that it has a high nutrition content and if processed effectively can be used for a number of different end products.

It has been proposed previously to pass the alfalfa through a press which extracts juice which can be used separately and in addition provides a product which is compressed and of reduced moisture content for more effective drying. One example of press of this type is shown in U.S. Pat. No. 4,125,070 (Besnard) and this includes a main press roller with a plurality of subsidiary rollers arranged at angularly spaced position around the main roller and each defining a nip with the main press roller for compressing the material and extracting juice. This press has however been of reduced effectiveness due to an inability to properly feed the material from a feed system into the nips.

The above press has been proposed for use with a previous dryer arrangement in which the compressed alfalfa is fed into a rotating drum. One example of a dryer of this type is shown in a brochure by M-E-C Company. The drum is horizontal with an inlet at one end and an outlet at an opposed end. A fan draws air through the drum so that the compressed crop material is deposited into the air stream passing through the drum at the inlet end of the drum and is carried through the drum to a separation cyclone at the outlet end of the drum. A combustion chamber is directly attached to the inlet end of the drum so that combustion products and heat are injected into the interior of the drum and are carried through the drum with the air stream and the crop material to be dried.

This proposed arrangement of the press and the drying apparatus has achieved some success. However the drawing apparatus also has some disadvantage in that the combustion products are directly carried into and mixed with the crop materials leading to an accumulation of benzopyrene and other combustion products in the crop materials which can be highly hazardous to the subsequent use or consumption of the product.

SUMMARY OF THE INVENTION

It is one object of the present invention, therefore, to provide an improved press for the drying apparatus.

According to the invention there is provided apparatus for drying crop material comprising a press for receiving the crop material for extracting juice therefrom to form a compressed mass of the crop materials of reduced moisture content, the press comprising a main press roller having a cylindrical surface surrounding an axis of rotation of the main press roller, a plurality of subsidiary press roller at angularly spaced positions around the main press roller such that each defines with the main press roller a respective nip, each of the rollers being rotatable about a respective axis with the axes parallel, means for feeding the material to the main press roller such that the material passes through each nip in turn, the main press roller having therein an array of axially and angularly spaced radially extending fingers rotatable with the roller about an axis offset from the axis of the roller such that the fingers project outwardly from the surface of the roller at one part of the surface and are retracted into the roller at a second part of the surface, the fingers being arranged to engage the crop material ahead of the first subsidiary roller and to be retracted at least some of the nips.

It is a further object of the present invention to provide an improved drying section for the apparatus which avoids the contamination of the crop materials with combustion products such as benzopyrene, According to the invention, therefore, there is provided apparatus for drying crop materials comprising a tumbling cylinder having an inlet and an outlet, fan means for passing air through the tumbling cylinder from the inlet to the outlet, means for feeding the crop material into the inlet for movement with the air to the outlet for drying the crop material within the tumbling cylinder, means for receiving the dried crop material and the air from the outlet and for separating the dried crop material from the air, and heating means for heating the air and crop material in the tumbling cylinder, the heating means comprising a heat exchanger having a first path therethrough separated from a second path therethrough, means for passing the air through the first path from an air inlet to the inlet of the tumbling cylinder and combustion means for generating heat and combustion products and for passing the heat and combustion products through the second path to heat the air in the first path whereby the air and crop materials are maintained separate from the combustion products, When processing high feed rates of material it is necessary to ensure that the juice extracted from the crop material is rapidly and effectively transported away from the squeeze nip and accordingly it is another object of the present invention to provide an improved press roller design which allows rapid discharge of the juice.

According to a further aspect of the invention there is provided an apparatus for drying crop material comprising a press for receiving the crop material for extracting juice therefrom to form a compressed mass of the crop materials of reduced moisture content, the press comprising a main press roller having a cylindrical surface surrounding an axis of rotation of the main press roller, a plurality of subsidiary press roller at angularly spaced positions around the main press roller such that each defines with the main press roller a respective nip, each of the rollers being rotatable about a respective axis with the axes parallel, and means for feeding the material to the main press roller such that the material passes through each nip in turn, each subsidiary press roller comprising a plurality of parallel, coaxial, axially spaced disks and means mounting the disks in a stack such that edges of the disks lie in a cylindrical surface for defining said nip with said main press roller, the mounting means comprising a plurality of separate spacers so as to define a path through the space between each disk and the next for passage of juice squeezed from the crop material, each disk being shaped so as to be thicker in an axial direction at the edge than at the area thereon between the edges such that the space between each disk and the next is greater in the area between the edges.

One embodiment of the invention will now be described in conjunction with the accompanying drawings in which:

BRIEF DESCRIPTION OF THE DRAWINGS

FIG. 4 is a schematic longitudinal cross sectional view of the press of FIG. 1.

FIG. 5 is a cross-sectional view along the lines 5—5 of FIG. 4.

In the drawings like characters of reference indicate corresponding parts in the different figures.

DETAILED DESCRIPTION

Figure 1:
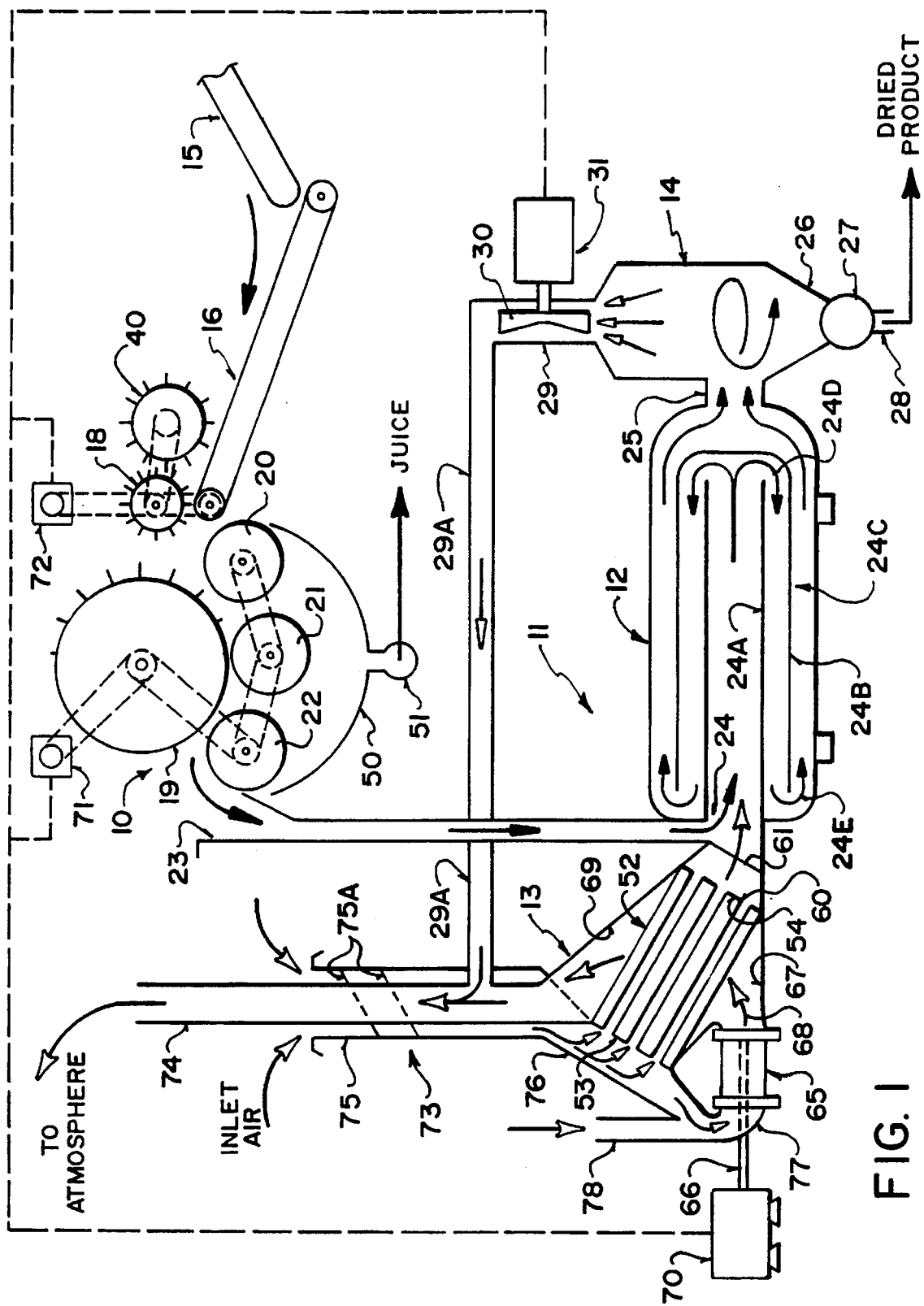
FIG. 1 is a schematic layout of the drying apparatus according to the present invention.

The drying apparatus of FIG. 1 comprises a press generally indicated at 10 and a drying apparatus generally indicated at 11 including a tumbling cylinder 12, a heating section 13 and a separating section 14. In general, harvested crop material is supplied by a chute 15 onto a belt conveyor 16 which transports the crop material upwardly and toward the press 10 in an incline direction. The crop material passes under a guide roller 18 which forms a nip with an end of the belt 16 for discharging the crop material in a slightly compressed condition into the press 10.

The press 10 includes a main compression roller 19 and three subsidiary rollers 20, 21 and 22 arranged at angularly spaced positions around the main roller 19. The subsidiary rollers and the main roller each have an axis with the axes parallel so that the three subsidiary rollers each form a nip with the main roller through which the crop material can pass driven by rotation of the rollers. In between each nip roller and the next is provided a guide bar 17 to carry the material across the gap to ensure the material is properly fed into the next nip for crushing, the guide bar carrying a plurality of knives 171 projecting into engagement with the rollers and into the spaces between disks 201 of the rollers as shown in FIG. 5 and described hereinafter.

The squeezed and compressed crop material is discharged from the third nip between the main roller 19 and the subsidiary roller 22 and discharged into a chute 23 which carries the compressed crop material to the dryer section 11.

The tumbling cylinder 12 comprises a horizontal cylinder with an inlet 24 at one end of the cylinder an outlet 25 at an opposed end of the cylinder. Within the cylinder are provided guide walls 24A, 24B defining a labyrinth arrangement generally indicated at 24C so that the crop material together with transportation air, indicated by arrows 24D, 24B is carried through the labyrinth arrangement 24C from the inlet 24 to the outlet 25. The cylinder 12 is mounted for rotation so that the crop material is tumbled within the cylinder while it is transported in the transportation air stream.

At the outlet 25 is provided the separation section 14 in the form of a cyclone of conventional shape which causes the crop material and air stream to swirl within the cyclone thus allowing the crop material to fall to a base 26 of the cyclone for discharge through an airlock 27 of the cyclone into a collection duct 28. Simultaneously the air separated from the crop material moves upwardly into an outlet duct 29 at the top of the cyclone.

Air flow through the tumbling cylinder and through the separation system is generated by a fan 30 driven by a motor 31 mounted within the duct 29. This location of the fan positions the fan at the coolest part of the air stream so that the fan is not impacted by the highly heated air emerging from the heating section 13.

The heating section generates heat which is applied to the air drawn into the inlet 24 of the tumbling cylinder by the fan 30. The heated air thus drives the moisture out of the crop material with the moisture being carried through the duct 29 for discharge.

The arrangement described above constitutes a prior art arrangement and in particular the press described above is shown in U.S. Pat. No. 4,125,070 mentioned above.

The arrangement of the present device is modified relative to the prior art by the following features:

With regard to the press 10, the press is improved by an improved feeding system which allows the relatively bulky crop material, particularly alfalfa for which the present arrangement is particularly designed, to be fed properly into the nips between the rollers 20, 21 and 22 and the main roller 19. The feeding system is therefore improved by the addition of a guide roller 40 prior to the conventional feed roller 18. The guide roller 40 is of larger diameter than the feed roller 18 so as to constrain the crop material particularly alfalfa to pass initially under the guide roller 40 so that it can then be compressed to pass through the nip between the feed roller 18 and the end roller of the belt 16. The guide roller 18 is spaced from the surface of the belt 16 and carries fixed fingers 41 which grasp the crop material indicated at 42 and carry the crop material under the guide roller for feeding as a mat into the area underneath the feed roller 18.

The press is further improved by the addition of retractable fingers 43 mounted in the main press roller 19. The fingers 43 are arranged in rows and columns around the periphery of the roller 19 and are mounted in guide openings 44 in the periphery of the roller 19 so that the fingers can be moved from a retracted position as indicated at 43A to an extended position as indicated at 43B. In order to obtain this movement, the fingers are mounted on a shaft 45 which is offset from an axis 46 of rotation of the roller 19, The shaft 45 remains in fixed position relative to the axis while the radially extending fingers 43 rotate with the roller. This causes the fingers to move from a fully retracted position on the side of the axis 46 opposite to the shaft 45 and to a fully extended position on the side of the axis 46 which is the same as the shaft 45. In this arrangement the fully extended position is arranged to be at or adjacent the feed roller 18 so that the crop material emerging from the nip under the feed roller 18 as indicated at 47 is grasped by the fingers and carried into the nip between the roller 19 and the roller 20.

As shown the nip area between the roller 20 and the roller 19 is larger than the nip area between the roller 21 and the roller 19. The fingers 43 are thus not fully retracted as they pass through the nip area indicated at 20A of the roller 20 so that they insist in carrying the material through that nip area. However the nip area is sufficiently small to effect an initial crushing of the crop material so it can then be carried by the guide plates 17 into the nip area 21A of the roller 21. The fingers 43 are fully retracted at the roller 21 so that the crop material can be fully crushed in that area and the juice squeezed from the material in the manner described in the above patent.

In addition to the improvement to the feeding system for the crop material, the arrangement as shown further includes a juice collection system in the form of a cradle 50 mounted under the roller 20, 21 and 22 so as to receive the juice dripping therefrom due to the crushing action between the rollers and the main roller 19. At the bottom of the cradle is provided a duct 51 into which the juice runs due to the concave curvature of the cradle 50 for transportation of the juice through the duct to a collection and utilization system not forming part of the present arrangement.

In a yet further improvement as shown in FIG. 5, each subsidiary press roller comprises a plurality of parallel, coaxial, axially spaced disks 201 and means mounting the disks in a stack such that edges of the disks lie in a cylindrical surface for defining said nip with said main press roller, the mounting means comprising a plurality of separate spacers 202 so as to define a path through the space between each disk and the next for passage of juice squeezed from the crop material, each disk being shaped so as to be thicker in an axial direction at the edge 203 than at the area 204 thereon between the edges such that the space 205 between each disk and the next is greater in the area between the edges than at the edges. This allows the juice extracted from the crop material to run quickly from the nip at the edge through the space between the disks for collection.

In one example the press described above can process 17 tons per hour of crop material with a depth on the feed belt of 66 cms (approximately 26 inches), with the nips of the three subsidiary press rollers defining compression forces of 15000 kg, 125000 kg and 25000 kg respectively.

Turning now to the heating system 13 of the drying apparatus 11, this is modified relative to the conventional prior arrangement by the addition of a heat exchanger 52. The heat exchanger is shown in more detail in FIGS. 2 and 3 and comprises the first end plate 53 and a second end plate 54 which are spaced and parallel with each of the end plate having a plurality of holes 55 aligned in rows. The holes are aligned in a first row 55A, a second row 55B, a number of intermediate rows, a penultimate row 55X and a last row 55Y. Each of the aligned holes in the end plates 53 and 54 carries a tube 56 which has its ends mounted in the end plates and extends therebetween as a continuous elongate cylindrical tube. The tubes are formed from extruded ceramic material and particularly a recrystalized silicon carbide.

Such a material is a fine grained, self bonded silicon carbide composition which can be formed into the relatively simple shape of the cylindrical tube. Such tubes are self supporting with sufficient structural strength to maintain structural stability across the space between the end plates 53 and 54. The porosity of the material is insufficient to allow significant communications of materials from outside the tubes to the interior of the tubes.

The heat exchanger further includes side plates 57 and 58 thus defining a rectangular enclosure with the end plates which surrounds the array of tubes. The rectangular enclosure has an open bottom and an open top. Attached to the end plate 54 is a discharge plenum 59 which has a first end face 60 matching the dimensions of the end plate 54 so as to receive air passing through the tubes into the discharge plenum. The discharge plenum further includes a converging wall converging to a circular outlet 61. The discharge plenum thus has sheet metal walls shaped to converge from the initial rectangular shape to the final circular discharge shape. Within the discharge plenum are mounted four baffles 62 each having a leading edge 63 and a trailing edge 64. The leading edge is located at the end 60 and the trailing edge is located at the discharge opening 61. The leading edge is arranged at one side edge of the end 60 and extending at right angles to that side edge across the end 60. The trailing edges 64 are similarly arranged at the outside edge of the circular discharge opening 61 extending radially thereof. It will be noted that the leading edge of each baffle is turned through 90° relative to the trailing edge of each baffle. In addition that baffle which has the leading edge at the top edge of the inlet opening 60 is smoothly curved so that the trailing edge is positioned at one side of the discharge opening 61. These baffles thus contact air escaping from the tubes 56 and act to twist the air as it passes through the discharge plenum thus causing a rotation in the air as it exits through the discharge opening 61.

As shown in FIG. 1, the discharge opening 61 is arranged so as to inject the air into the opening 24 of the tumbling cylinder 12. The air as it is injected therefore is twisted by the baffles so that the air is rotating within the tumbling cylinder thus acting to mix the air to provide consistent temperature through the air and at the same time acting to further mix the air and crop material as the crop material is fed through the chute 23.

The heat exchanger is heated by a heating system indicated at 65. The heating system in the preferred arrangement comprises a co-generation gas turbine one example of which is manufactured by Turbomeca of 64511 Bordes Cedex Franc having an associated company at Turbomeca Engine Corp. Grande Prairie Tex. Such a device is presently commercially available and provides the co-generation of heat and power through a gas turbine system. Thus the co-generation gas turbine includes a drive shaft 66 which is driven by the combustion of the gas within the gas turbine and at the same time the combustion is used to generate significant temperature in the air driven through the gas turbine. The gas turbine is thus designed to generate heat and rotation rather than any significant longitudinal thrust.

If required in any particular installation, the co-generation gas turbine can be replaced by an alternative energy source such as combustion of available products including wood, coal, oil or garbage incineration.

Figure 2:
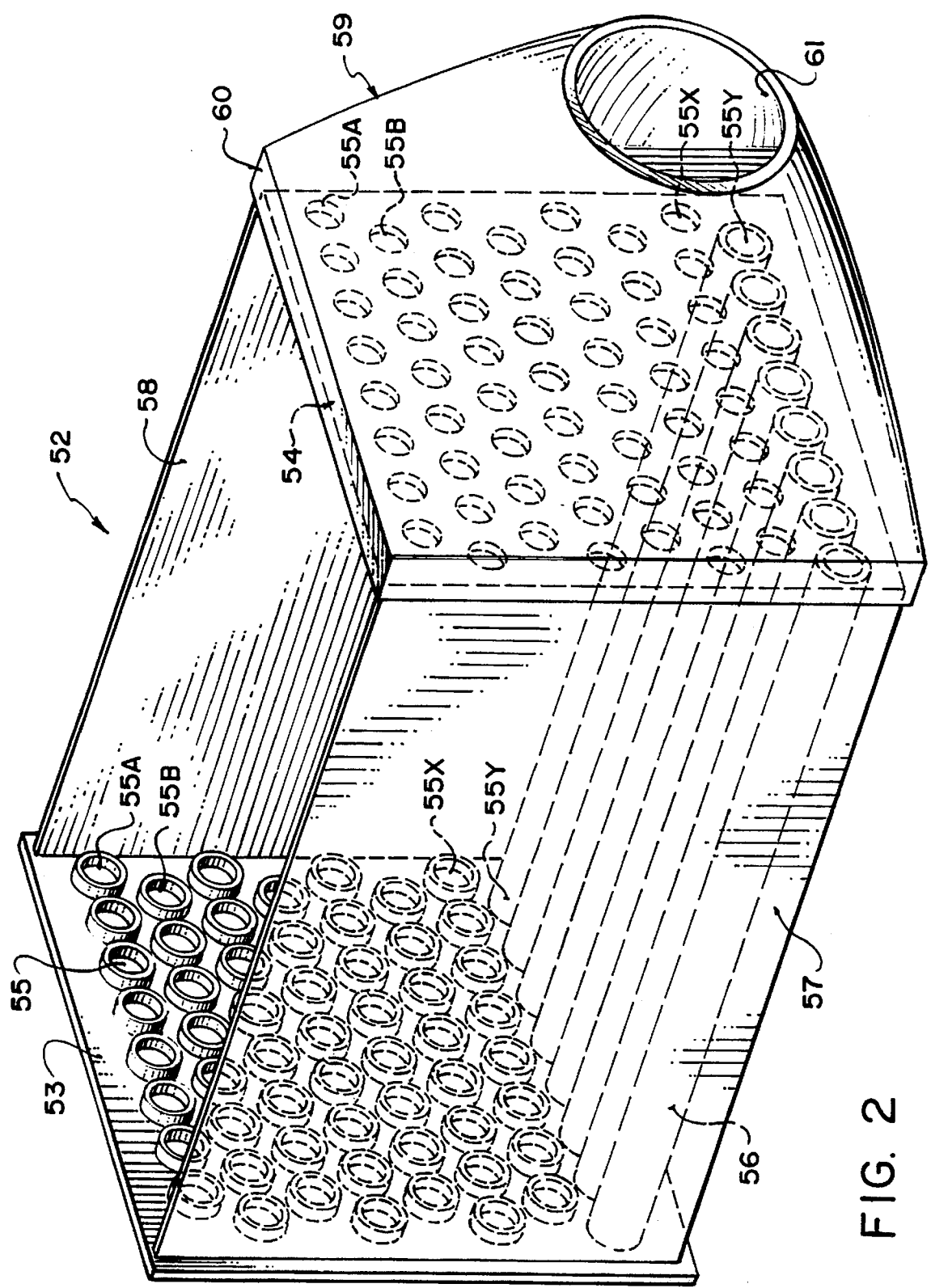
FIG. 2 is an enlarged isometric view showing schematically the construction of the heat exchanger of the drying system.
Figure 3:
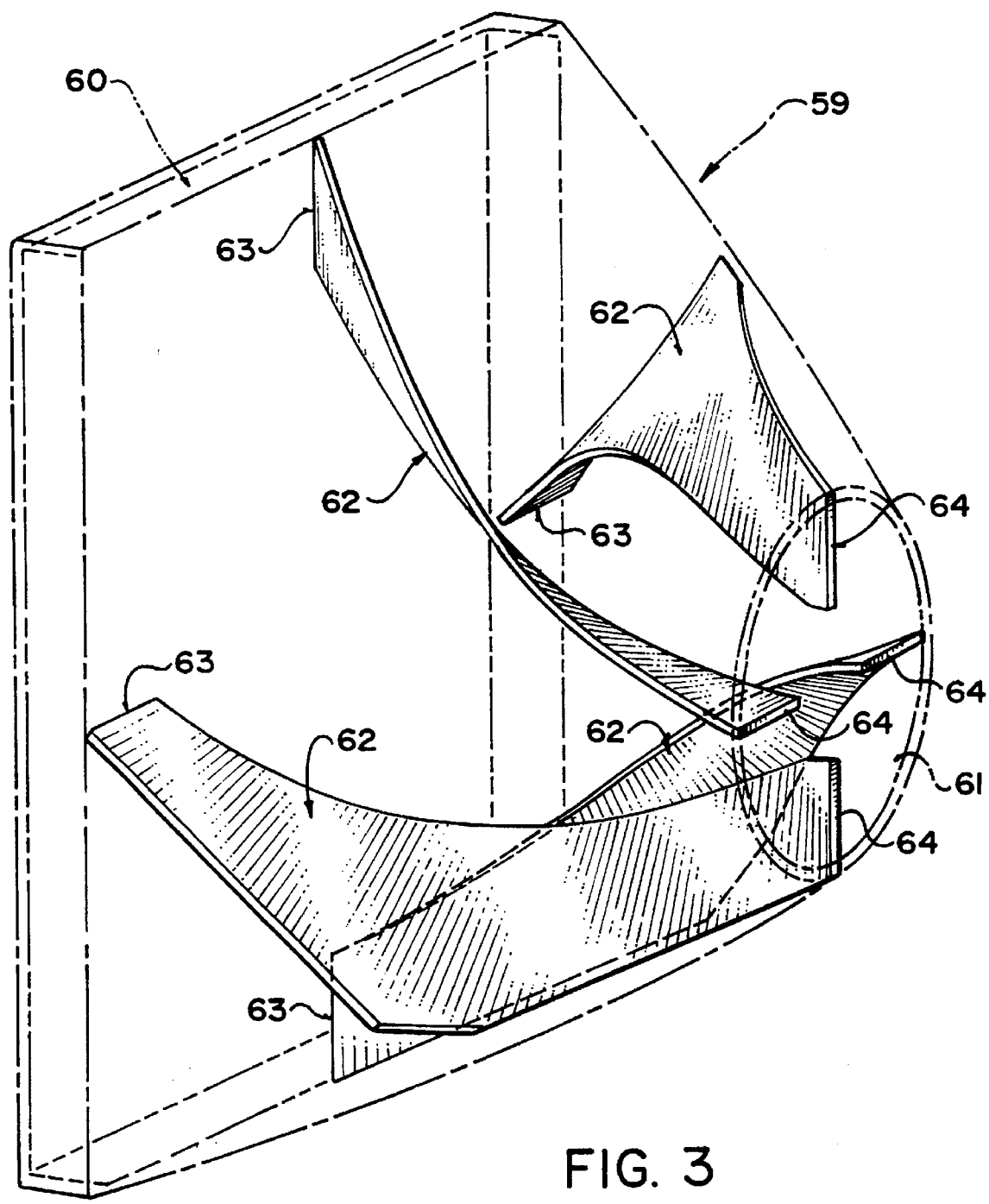
FIG. 3 is an isometric view showing schematically the discharge plenum of the heat exchanger of FIG. 2.

The air flow is injected into the bottom open face of the heat exchanger of FIG. 2 by a guide duct which extends from a discharge mouth 68 of the gas turbine and diverges outwardly in the form of an inlet plenum having a circular open mouth at the discharge end 68 and a rectangular discharge mouth matching the open face of the heat exchanger 52. The air is thus injected into the heat exchanger 52 so as to impinge upon the bottom row 55Y of tubes. The air thus swirls around and passes between the tubes in the relatively narrow spaces between the tubes and exits from the slots defined between the tubes so as to impinge upon the next row 55X of tubes. It will be noted that the next row 55X is offset so that each tube of the row 55X lies between two of the tubes of the row 55Y to allow direct impingement of the air onto the tubes. The same offset arrangement continues through the intermediate rows to the top row 55A so that the air can escape from the top row into a plenum 69.

The selection of the tubes as defined above allows the use of the co-generation of the gas turbine and the high air temperature defined above since the ceramic tubes can accommodate such high temperatures without breakdown.

The drive shaft 66 is connected to an alternator 70 which generates electric power for use in the remainder of the apparatus. Thus the electric power from the alternator 70 is used to drive a motor 71 to the rollers of the press, a motor 72 to the belt 16 and feed roller system 18 and a motor 31 of the fan 30.

The drying apparatus further includes a flue and inlet system generally indicated at 73. This includes a flue 74, connected to the plenum 69 and defining a cylindrical duct extending vertically upwardly from the plenum 69 for discharge to atmosphere. Thus the plenum 69 is shaped to converge from the rectangular shape at the upper end face of the heat exchanger 52 to a circular shape connected to the inlet end of the flue duct 74.

The duct 29 includes a portion 29A extending beyond the fan and connected into the duct 74 at a position above the plenum 69. Thus all of the air passing through the system is fed into the duct 74 for common discharge to atmosphere.

The inlet system includes an air inlet duct 75 which is in heat exchanging relation with the flue duct 74. In the arrangement as shown, the inlet duct 75 surrounds the flue duct and contains a helical baffle 75A so as to cause the air to rotate around the flue duct 74 and to receive heat therefrom for preliminary heating of the air which is fed both to the inlet end of the tubes of the heat exchanger 52 and to the co-generation gas turbine 65. Thus the bottom end of the surrounding air inlet 75 includes a duct 76 which by passes the plenum 69 and is connected at one side of the duct 76 to the end plate 53 of the heat exchanger with a duct 76 passing beyond the end plate 53 to an inlet opening at additional variable inlet 78 is provided at the lower end of the duct 76 so as to allow adjustment of the amount of combustion air to be added to the gas turbine 65.

It will be noted that the heat exchanger 52 is inclined so that the tubes inclined upwardly and rearwardly away from the inlet end 24 of the tumbling cylinder. Thus the inlet end 20 plate 53 of the heat exchanger is raised above the discharge end plate 54. This allows the plenum 67 to be simple and relatively small so that the gas turbine system 65 can be located in effect partly underneath the inclined heat exchanger. This keeps the heat generation system to a compact construction and limits the amount of movement of the heated air so as to avoid heat losses and so as to avoid impingement of the highly heated air on more than a minimum area of containment surface.

The drying apparatus of the present invention therefore provides a very high efficiency utilizing up to 80% of the energy in drying of the crop materials. It will be appreciated that drying requires a high energy input which can in many cases prevent the economic viability of the system. The present apparatus therefore provides a high efficiency which allows the economic viability of the processing Alfalfa to allow the development of a number of Alfalfa products thus significantly increasing the commercial viability of this crop.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. Apparatus for drying crop materials comprising:

a tumbling cylinder having an inlet and an outlet;

a fan for passing air through the tumbling cylinder from the inlet to the outlet;

means for feeding the crop material into the inlet for movement with the air to the outlet for drying the crop material within the tumbling cylinder;

means for receiving the dried crop material and the air from the outlet and means for separating the dried crop material from the air;

a heat exchanger having a first path portion therethrough separated from a second path portion therethrough;

means defining a first air flow path including the first path portion and including the fan for passing the air through the first air flow path from an air inlet to the inlet of the tumbling cylinder and through the tumbling cylinder to an air outlet;

combustion means including a combustion element for burning a fuel material and thus generating heat and combustion products;

a flue;

and means defining a second air flow path including said combustion element, second path portion and said flue and arranged for passing the heat and combustion products through the second path portion of the heat exchange to generate heated air in the first path portion; the first air flow path being separate from the first air flow path and the combustion element being located only in the second air flow path such that the heated air and crop materials are maintained separate from the combustion products.

2. The apparatus according to claim 1 wherein the heat exchanger includes a plurality of tubes extending from an inlet plenum to a discharge plenum, the discharge plenum being connected to the inlet of the tumbling cylinder.

3. The apparatus according to claim 2 wherein the tubes are formed from ceramic material.

4. The apparatus according to claim 2 wherein the discharge plenum includes a rectangular end at the heat exchanger and converges inwardly therefrom to a circular end at the inlet to the tumbling cylinder.

5. The apparatus according to claim 1 wherein the tumbling cylinder has a horizontal axis with the inlet at one end thereof and wherein the heat exchanger is arranged such that the first path is inclined upwardly and away from the inlet end of the tumbling cylinder, the second path extending from an underside of the heat exchanger upwardly and toward the tumbling cylinder to a discharge flue extending vertically upwardly from the heat exchanger, the combustion means being located at least partly underneath the heat exchanger so as to direct the combustion products upwardly into the second path of the heat exchanger.

6. The apparatus according to claim 1 wherein the flue has an air inlet jacket at least partly surrounding the flue for entry of inlet air to the heat exchanger and to the combustion means such that the air is heated by the flue in a heat exchange arrangement.

7. The apparatus according to claim 6 including duct means for communicating air from the separating means to the flue.

8. The apparatus according to claim 1 wherein the combustion means comprises a co-generation gas turbine having an output drive shaft and wherein the combustion element is arranged to generate rotation of the output drive shaft and heat wherein the heat is communicated to the heat exchanger.

9. The apparatus according to claim 8 including means for generating power from the shaft for communication to other elements of the apparatus.

10. The apparatus according to claim 9 wherein the apparatus includes a press for receiving the crop materials and for expressing juice therefrom to form a compressed mass of the crop materials of reduced moisture content, the power from the output shaft being used to drive the press.

11. The apparatus according to claim 9 including an alternator driven by the output shaft.

12. The apparatus according to claim 1 wherein the tumbling cylinder has a horizontal axis with the inlet at one end thereof and wherein the heat exchanger is arranged such that the first path portion is inclined upwardly and away from the inlet end of the tumbling cylinder, the second path portion extending from an underside of the heat exchanger upwardly and toward the tumbling cylinder to a discharge flue extending vertically upwardly from the heat exchanger, the combustion means comprising a co-generation gas turbine having an output drive shaft and the combustion element arranged to generate rotation of the output drive shaft and heat which is communicated to the heat exchanger with the co-generation gas turbine located at least partly underneath the heat exchanger so as to direct the combustion products upwardly into the second path of the heat exchanger and so that a longitudinal axis of the output drive shaft is parallel to the axis of the tumbling cylinder.

13. The apparatus according to claim 3 wherein the tubes are formed from silicon carbide.

14. The apparatus according to claim 1 including a press for receiving the crop material for extracting juice therefrom to form a compressed mass of the crop materials of reduced moisture content, the press comprising a main press roller having a cylindrical surface surrounding an axis of rotation of the main press roller, a plurality of subsidiary press roller at angularly spaced positions around the main press roller such that each defines with the main press roller a respective nip, each of the rollers being rotatable about a respective axis with the axes parallel, means for feeding the material to the main press roller such that the material passes through each nip in turn, the main press roller having therein an array of axially and angularly spaced radially extending fingers rotatable with the roller about an axis offset from the axis of the roller such that the fingers project outwardly from the surface of the roller at one part of the surface and are retracted into the roller at a second part of the surface, the fingers being arranged to engage the crop material ahead of the first subsidiary roller and to be retracted at least some of the nips.

15. The apparatus according to claim 14 including means for feeding crop materials to the main press roller, the feeding means comprising a belt conveyor and a guide roller for compressing the crop materials onto the belt conveyor, the fingers being presented toward a discharge end of the belt conveyor for grasping the material discharged therefrom.

16. The apparatus according to claim 14 wherein each subsidiary press roller comprises a plurality of parallel, coaxial, axially spaced disks and means mounting the disks in a stack such that edges of the disks lie in a cylindrical surface for defining said nip with said main press roller, the mounting means comprising a plurality of separate spacers so as to define a path through the space between each disk and the next for passage of juice squeezed from the crop material, each disk being shaped so as to be thicker in an axial direction at the edge than at the area thereon between the edges such that the space between each disk and the next is greater in the area between the edges.

17. Apparatus for drying crop materials comprising:

a tumbling cylinder having an inlet and an outlet;

a fan for passing air through the tumbling cylinder from the inlet to the outlet;

means for feeding the crop material into the inlet for movement with the air to the outlet for drying the crop material within the tumbling cylinder;

means for receiving the dried crop material and the air from the outlet and for separating the dried crop material from the air;

a heat exchanger having a first path portion therethrough separated from a second path portion therethrough;

means defining a first air flow path including the first path portion and including the fan for passing the air through the first air flow path from an air inlet to the inlet of the tumbling cylinder and through the tumbling cylinder to an air outlet;

combustion means including a combustion element for burning a fuel material and thus generating heat and combustion products;

a flue;

and means defining a second air flow path including said combustion element, second path portion and said flue and arranged for passing the heat and combustion products through the second path portion of the heat exchanger to generate heated air in the first path portion;

the first air flow path being separate from the first air flow path and the combustion element being located only in be second air flow path such that the heated air and crop materials are maintained separate from the combustion products;

wherein the tubes are arranged in array so as to extend in mutually parallel arrangement from the inlet plenum at one end to the discharge plenum at the other end, the tubes being arranged in rows with the rows lying in parallel planes, the tubes of alternate rows being offset relative to the tubes of the next previous row such that materials passing between two tubes of the previous row engage with the tubes of the alternate rows.

18. Apparatus for drying crop materials comprising:

a tumbling cylinder having an inlet and an outlet;

a fan for passing air through the tumbling cylinder from the inlet to the outlet;

means for feeding the crop material into the inlet for movement with the air to the outlet for drying the crop material within the tumbling cylinder;

means for receiving the dried crop material and the air from the outlet and means for separating the dried crop material from the air;

a heat exchanger having a first path portion therethrough separated from a second path portion therethrough;

means defining a first air flow path including the first path portion and including the fan for passing the air through the first air flow path from an air inlet to the inlet of the tumbling cylinder and through the tumbling cylinder to an air outlet;

combustion means including a combustion element for burning a fuel material and thus generating heat and combustion products;

a flue:

and means defining a second air flow path including said combustion element, second path portion and said flue and arranged for passing the heat and combustion products through the second path portion of the heat exchanger to generate heated air in the first path portion;

the first air flow path being separate from the first air flow path and the combustion element being located only in the second air flow path such that the heated air and crop materials are maintained separate from the combustion products;

wherein the beat exchanger includes a plurality of tubes extending from an inlet plenum to a discharge plenum, the discharge plenum being connected to the inlet of the tumbling cylinder;

and wherein the discharge plenum includes a plurality of baffles therein for causing rotation of the air passing through the discharge plenum relative to a central axis of the discharge plenum longitudinal of the discharge plenum so as to generate rotation of the air as it enters the tumbling cylinder.

19. The apparatus according to claim 18 wherein the flue has an air inlet jacket at least partly surrounding the flue for entry of inlet air to the heat exchanger and to the combustion means such that the air is heated by the flue In a heat exchange arrangement.

* * * * *